Nov. 24, 1936.  C. GIELEN, SR  2,062,218
GAS TANK SAFETY VALVE
Filed Nov. 5, 1934
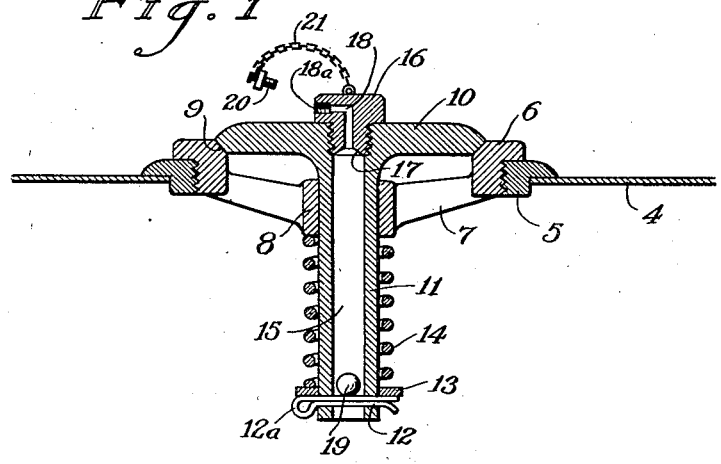
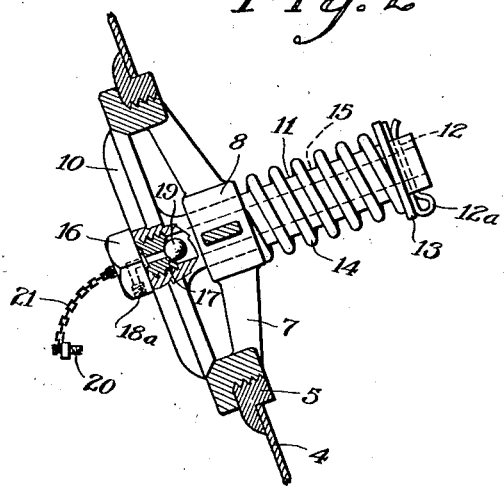
Cyrille Gielen, Sr.
INVENTOR
BY Victor J. Evans & Co.
ATTORNEY Patented Nov. 24, 1936

2,062,218

UNITED STATES PATENT OFFICE 2,062,218

GAS TANK SAFETY VALVE

Cyrille Gielen, Sr., West Paterson, N. J.

Application November 5, 1934, Serial No. 751,655

2 Claims. (Cl. 220—44)

This invention relates to improvements in safety or vent valves for liquid fuel tanks and has for its principal object the provision of a means by which the venting of the excessive pressure within the tank is effected.

It has been observed that the greater part of the damage occurring from fires in or about gasoline propelled vehicles is caused by the fact that the heat being applied to the fuel tank causes a resultant expansion of the fuel to a dangerous degree, which eventually results in the complete explosion of the entire tank contents. It is with this hazard in mind that I have provided a means by which the tank may under such circumstances be safely vented to obviate such dangerous conditions, which device however will not interfere in any way with the normal functions of the fuel tank.

A further object of my invention is to provide a device of the character described of such simple and rugged construction as to insure economical manufacture as well as dependable service.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

In the drawing:

Fig. 1 is a central vertical sectional view of my device; and

Fig. 2 is a side elevational view, with parts in section, of my device disposed at an angle to illustrate the operation thereof when the vehicle has been upset.

Referring now to the drawing for a more detailed description thereof, the numeral 4 indicates a horizontal portion of a gasoline fuel tank as usually employed on a vehicle. A flange ring 5 is attached in substantially horizontal position to the fuel tank 4 by welding or other suitable means and is provided at its inner surface with a threaded surface adapted to threadedly engage a valve body 6. Depending from the valve body 6 is a spider-like structure 7, the radial arms of which terminate in a centrally disposed sleeve 8. The upper annular surface of the valve body 6 is chamfered to form a valve seat 9 which in conjunction with a valve 10 forms an air-tight closure to the interior of the tank. Integral with the valve 10 is a depending valve stem 11 slidably mounted in the sleeve 8. The lower end of valve stem 11 is provided with a lateral aperture 12 into which a cotter pin or other suitable device 12a is inserted to retain, in conjunction with a washer 13, a helical compression spring 14, which surrounds the valve stem 11 and has its upper end engaged against the sleeve 8. The valve stem 11 is provided with a centrally disposed bore 15 extending vertically thru same, the upper terminal end of which is provided with a tapped portion to receive a vent screw 16, which at its lower surface is conically formed to provide a vent valve seat 17. Vent screw 16 is provided with a transverse port and a centrally disposed port, both of which form a vent 18 by which the interior of the tank is communicated to the outside atmosphere thru the bore 15, in which bore is disposed a loose fitting ball 19 which is retained therein by the cotter pin 12a. Vent 18 functions as does the usual vent provided on a gasoline tank, namely, that of permitting air to enter the tank as the fuel is withdrawn therefrom.

As outlined in the foregoing object, my device is provided to forestall the accumulation of excessive pressures within the tank when same is subjected to external heat. When this condition arises the valve 10 is lifted from its seat 9 against the action of spring 14 by the force of the pressure created within the tank. The gasoline or other fuel is thus discharged thru the opening thus formed in such comparatively small quantities that should the discharge become ignited the resultant combustion will not effect an appreciable hazard. Should the fuel tank be subjected to flames while in its normal horizontal position a part of the pressure within the tank will accordingly be vented from the tank thru the vent port 18, which port however is of such small size as to control the discharge within safe limits.

Reference is now directed specifically to Fig. 2 wherein my safety valve is disposed at an angle to illustrate its position should the vehicle be accidentally upset. Such accidents often result in the burning of the entire vehicle, due to the combustion of the gasoline remaining in the vehicle's carburetor. In order to avoid the spilling out of the gasoline from the tank under such conditions and specifically to avoid the discharge of the gasoline thru the vent 18, the ball 19 is effective, which in this position becomes engaged on the valve seat 17, thus stopping any discharge thru the vent 18. The valve 10 will of course function under these conditions as previously described to safely vent the accumulated pressure within the tank.

In order to adapt my safety vent valve for use on liquid fuel tanks in which the fuel is removed from the tank by applying air pressure within same as well as the tank in which the fuel is removed by suction, I have provided removable means by which the vent 18 may be conveniently closed. To accomplish this result the terminal end of vent 18 outside the tank is threaded for a portion of its length, as indicated by numeral 18a, which threaded portion is adapted to receive a screw plug 20. A chain 21 having its ends attached respectively to the plug 20 and the upper surface of vent screw 16 prevents accidental loss of the plug 20, at the same time permitting the convenient installation of same if desired.

What is claimed as new and useful is:

1. The combination, with a tank, of a spring closed relief valve in a wall of the same, said relief valve having an air vent, a check valve for closing said vent when the tank is tilted, and other means for closing the outer end of said air vent.

2. The combination with a tank having a top opening, of a valve ring seat threadedly secured to the tank at the periphery of the opening, a relief valve closing said opening and positioned on said seat and including a depending stem, said valve having a vertical aperture therethru, a ring guide for said stem, arms connecting said guide and valve seat, a coiled spring around said stem tending to hold said valve on said seat, a ball check valve in said stem of smaller diameter than the aperture therein, a plug at the top of said valve, said plug having an aperture communicating with the aperture in said valve but of a smaller diameter, said ball check valve being adapted to close the aperture in the plug when the tank is tilted.

CYRILLE GIELEN, Sr.